United States Patent
Apel et al.

(10) Patent No.: US 6,549,500 B2
(45) Date of Patent: Apr. 15, 2003

(54) MEANS FOR READING A TABLE OF CONTENTS OF A NON-FINALIZED OPTICALLY READABLE DATA CARRIER

(75) Inventors: Christoph Apel, Vienna (AT); Herbert Treml, Krems an der Donau (AT); Helmut Unger, Vienna (AT); Wolfgang Wimmer, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/840,810

(22) Filed: Apr. 24, 2001

(65) Prior Publication Data

US 2002/0006095 A1 Jan. 17, 2002

(30) Foreign Application Priority Data

Apr. 27, 2000 (EP) .............................................. 00890133

(51) Int. Cl.[7] ................................................. G11B 7/00
(52) U.S. Cl. .................................... 369/53.22; 369/47.1
(58) Field of Search ........................... 369/47.1, 47.11, 369/47.14, 47.28, 47.46, 53.1, 53.11, 53.22, 59.1, 59.23, 44.28, 44.29

(56) References Cited

U.S. PATENT DOCUMENTS 4,607,355 A  *  8/1986  Koide ..................... 369/44.29
5,572,493 A  * 11/1996  Maeda et al. ............ 369/44.28

* cited by examiner

Primary Examiner—Muhammad Edun
(74) Attorney, Agent, or Firm—Michael E. Belk

(57) ABSTRACT

A reproduction apparatus (1) for reproducing data (A, D, ID) stored on a rotary drivable optically readable data carrier (2) includes drive means (6) for driving the data carrier (2) in accordance with a drive signal (AS), and drive control means (24) for generating a controlled drive signal (S1) while the read data (AD) are used, and detection means (45) for detecting whether data (AD) suitable for generating the controlled drive signal (S1) are available, and additional drive control means (42) for generating a controlled drive signal (S2), and control means (40) which are arranged for enabling the data carrier (2) to be driven in accordance with the controlled drive signal (S2) when data (AD) suitable for driving the data carrier (2) are lacking.

5 Claims, 2 Drawing Sheets

Figure 1:
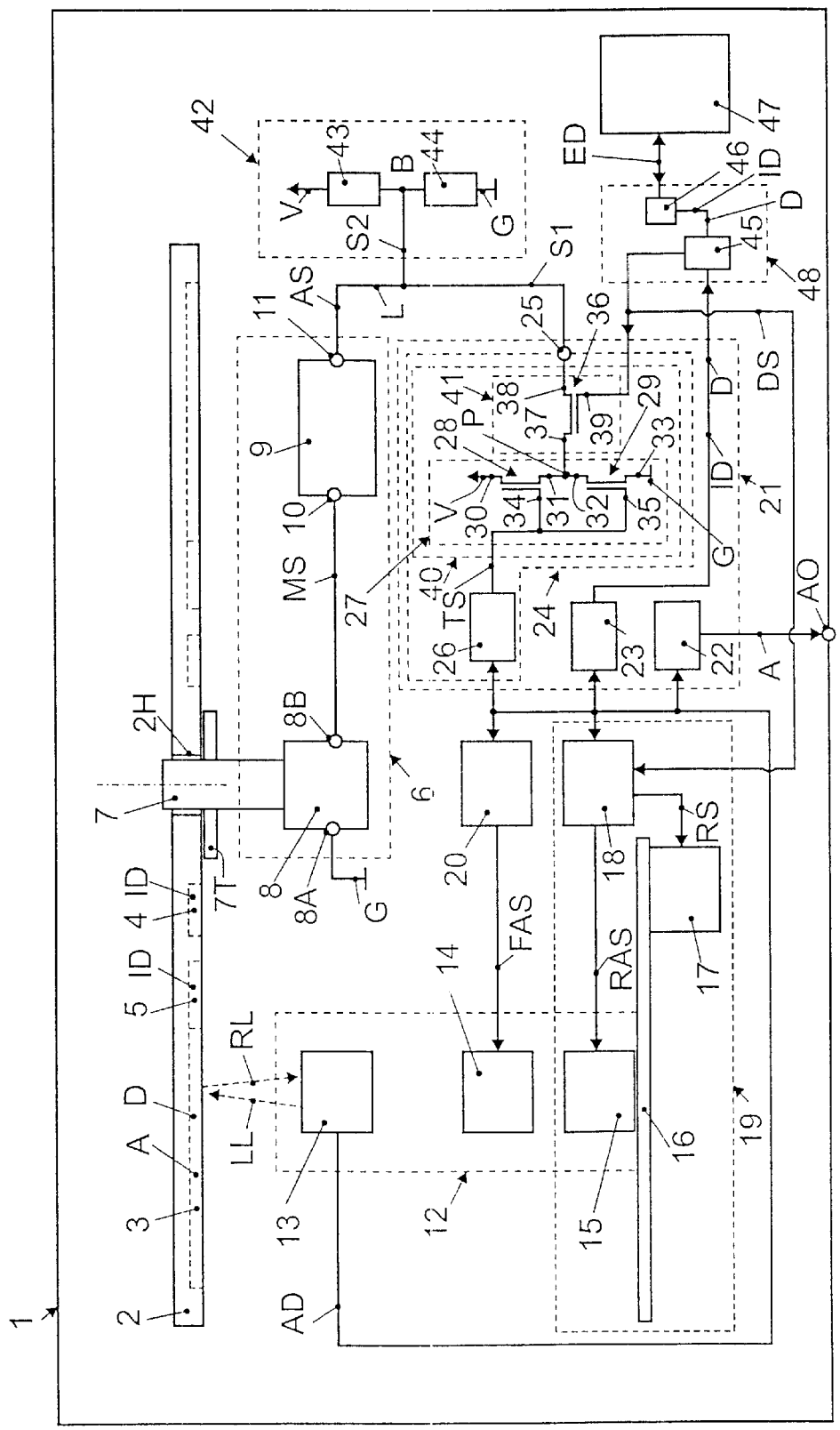

MEANS FOR READING A TABLE OF CONTENTS OF A NON-FINALIZED OPTICALLY READABLE DATA CARRIER

The invention relates to a reproduction apparatus which is provided for reproducing data stored along at least one track on a rotary drivable optically readable data carrier and which includes drive means which are arranged for receiving a drive signal and for driving the data carrier in accordance with the received drive signal, and which includes reading means which are arranged for reading the stored data and for delivering the read data and which includes drive control means which are arranged for receiving and evaluating the read data and for generating and delivering a controlled drive signal while the read data are used, to enable the data carrier to be driven in accordance with the controlled drive signal, and which includes detection means with whose help there may be detected whether read data suitable for generating the controlled drive signal are available and which are arranged for delivering a detection signal when such suitable data are lacking.

Such a reproduction apparatus of the type in accordance with the opening paragraph has been developed by the applicants and is marketed as a so-called CD player referred to as CD753 and is therefore known.

With the known reproduction apparatus there is the problem that a reproduction of data stored on a writable CD is absolutely impossible while the CD has not yet been brought to a finalized state. The CD in the non-finalized state has useful data in a useful data area, which in the present case represent at least a piece of music and additional data. Furthermore, the CD has a first contents data area in which contents data are temporarily stored, which represent a temporary table of contents about the at least one piece of music stored in the useful data area. The first contents data area is spatially separated from the useful data area on the CD. With a finalization, the contents data are read from the first contents data area and stored in the second contents data area, in which second contents data area the contents data are permanently stored and thus represent a final table of contents.

With a newly inserted CD the known reproduction apparatus first verifies whether there are useful data at all in the useful data area of the CD and, after a successful test, tries to read the contents data from the second contents data area, thus the final table of contents. The second contents data area, however, with a non-finalized CD, does not yet contain any contents data. In the known reproduction apparatus, the detection means establish in a completely unrecorded, thus non-finalized CD, that no useful data are read out from the useful data area. With an only partly recorded and thus non-finalized CD there is established that useful data are read from the useful data area, it is true, but after that no contents data are read from the second contents data area. Due to the lacking of the useful data in the former case and due to the lacking of the contents data in the latter case, the circumstances are that there are no data available for generating the controlled drive signal. In the known reproduction apparatus this causes parts of the reproduction apparatus to be deactivated and a warning to be generated which signals a supposed error, which does not correspond to reality and which is therefore not satisfactory for a user.

There may be observed that it is known from other reproduction apparatus that means are provided with the aid of which the useful data can be read from the useful data area of the non-finalized CD and a virtual table of contents of the non-finalized CD can be provided. These reproduction apparatus, however, have serious disadvantages, because with these means a distinction cannot be made between useful data in the useful data area, which are featured as deleted in the temporary table of contents, and useful data in the useful data area, which are featured as valid in the temporary table of contents. Furthermore, an end of new useful data in the useful data area with which old useful data in the useful data area are overwritten cannot safely be removed. Reading the useful data from the useful data area may be a lengthy operation under certain circumstances and finding the end of the useful data area may be linked with great difficulty. Therefore, these means lead to highly unreliable results, which are also highly unsatisfactory for the user of such a reproduction apparatus.

It is an object of the invention to resolve the problems defined above with a reproduction apparatus of the type defined in the opening paragraph and provide an improved reproduction apparatus, so that even in the case of a non-finalized data carrier, the temporary table of contents can be reliably found and read in the first contents data area and that thus the useful data in the useful data area of a non-finalized data carrier and of a finalized data carrier can be reproduced for a user without any problems and in a satisfactory manner.

The object defined above is achieved with a reproduction apparatus of the type defined in the opening paragraph, in that additional drive control means are provided which are arranged for generating and delivering a controlled drive signal, and in that control means are provided which are arranged for receiving the detection signal and which, as a result of receiving the detection signal, enable to drive the data carrier in accordance with the controlled drive signal.

Providing the characteristic features in accordance with the invention achieves in an advantageous manner that also when non-written areas of the data carrier are scanned, in which areas no data suitable for generating the controlled drive signal are stored, the data carrier is enabled to be driven at a constant angular velocity determined by the controlled drive signal, so that even when these areas of the data carrier are scanned, the angular velocity of the data carrier always remains within a suitable range, although no expensive electronics and no high-price optics are provided as are necessary for an evaluation of control information contained in a control track of the data carrier. Furthermore, the great advantage is achieved that first a temporary table of contents of a non-finalized data carrier is made possible with very simple means, which is in contrast to so-called CD writers already known, in which finding a temporary table of contents is possible, it is true, but at incomparably higher cost.

Providing the characteristic features as claimed in claim 2 achieves in an advantageous manner that both the regulated drive signal and the controlled drive signal can be sent over the single line to the drive means, so that additional lines and additional terminals for these additional lines may be omitted, which in turn leads to a reduction of the number of potential error sources. Furthermore, the advantage is obtained that it is only necessary to turn off at least one output of the drive regulating means to enable the data carrier to be driven in accordance with the controlled drive signal.

By providing the characteristic features as claimed in claim 3, there is achieved in an advantageous manner that an extremely simple embodiment of the switching means is made possible which, in turn, makes a contribution to realizing the switching means in a most cost-effective manner. Furthermore, the advantage is obtained that the cost of circuitry is kept lowest possible.

By providing the characteristic features as claimed in claim 4, there is achieved in an advantageous manner that the drive control means are arranged in an extremely simple manner and can therefore also be realized in an extremely cost-effective manner.

By providing the characteristic features as claimed in claim 5, there is achieved in an advantageous manner that the table of contents of a data carrier can be found and thereafter read in an extremely reliable and also fast manner.

The aspects defined above and further aspects of the invention will be apparent from the examples of embodiment to be described hereinafter and are explained with reference to these examples of embodiment.

The invention will be further described in the following with reference to two examples of embodiment shown in the drawings, to which, however, the invention is not restricted. In the drawings FIG. 1 shows in a diagrammatic manner in the form of a block diagram a part of a reproduction apparatus in accordance with a first example of embodiment of the invention, which part is essential in the present connection, FIG. 2 shows in a similar manner to FIG. 1 a part of a reproduction apparatus in accordance with a second example of embodiment of the invention.

Figure 2:
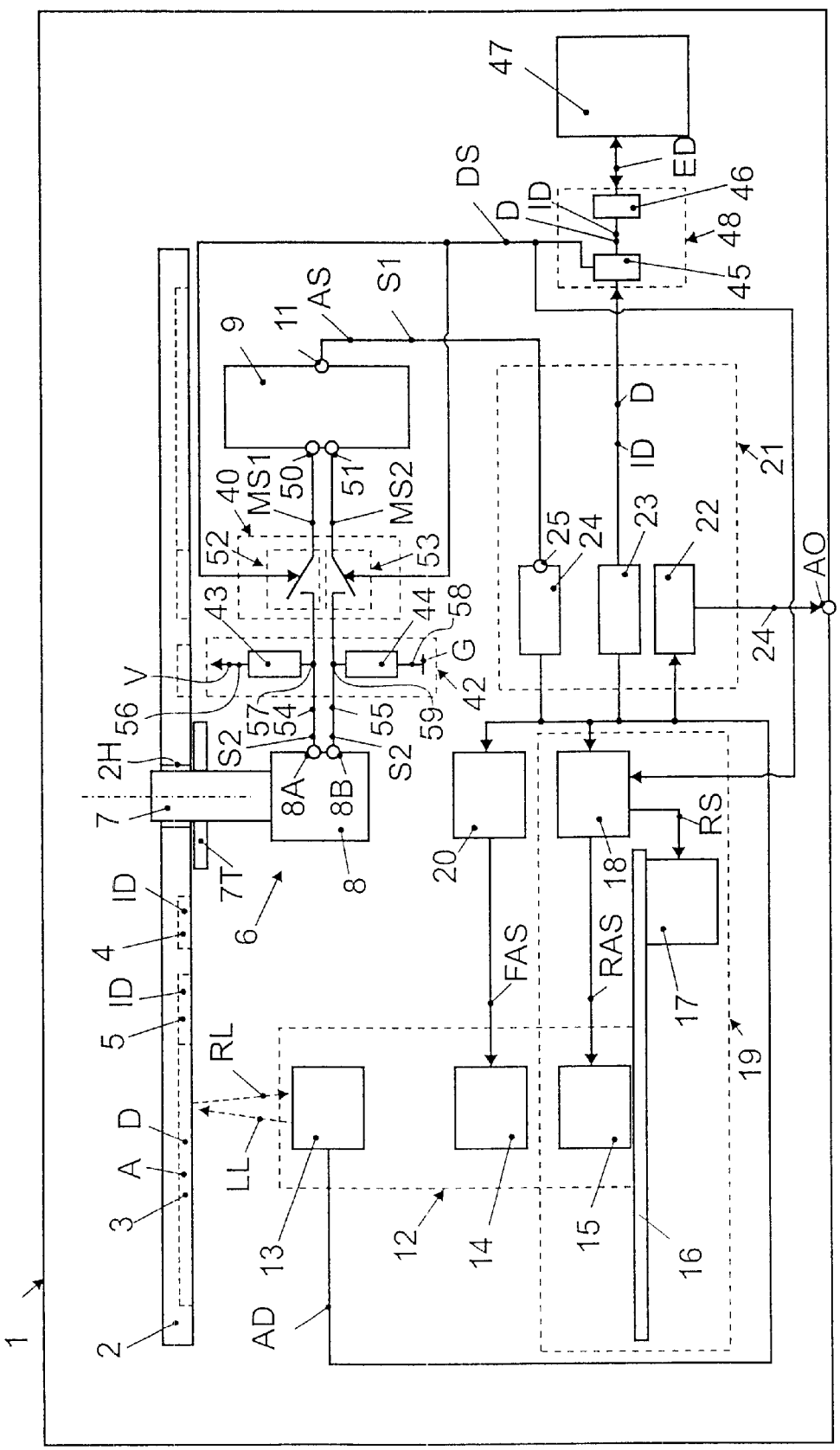

In FIG. 1 is shown part of a reproduction apparatus 1, which is arranged for reproducing data stored along a helical track on a rotary drivable optically readable data carrier 2. The data carrier 2 is in the present case formed by a compact disc, CD for short.

The data carrier 2 has a useful data area 3, which is arranged for storing useful data. The useful data, on their part, have audio data A and additional data D. The audio data A represent, for example, a digital representation of pieces of music, while the additional data D contain a numbering of the pieces of music and the additional data D further represent and indicate a playing time of the individual pieces of music. The data carrier 2 further has a first contents data area 4 which is separate from the useful data area 3. The first contents data area 4 is arranged for temporarily storing contents data ID of a table of contents. In this first contents data area 4 are temporarily stored when the data carrier 2 is manufactured, thus when the data carrier 2 is written with pieces of music with a so-called CD recorder, thus a CD writer, the contents data ID of a table of contents, which contents data ID then form a temporary table of contents. The data carrier 2 further has a second contents data area 5, which is separate from the useful data area 3 and from the first contents data area 4. The second contents data area 5 lies between the useful data area 3 and the first contents data area 4 and is provided for permanently storing contents data ID of a table of contents, which contents data ID then form a definitive table of contents. When the data carrier 2 is finalized with a CD recorder, thus CD writer, thus after pieces of music have been written on the data carrier 2, the contents data ID of the first contents data area 4 are transmitted to the second contents data area 5, which transmission is also carried out with the aid of the CD recorder. Accordingly, the second contents data area 5 has no contents data ID on a non-finalized data carrier 2.

The data carrier 2 further has in its center a centering hole 2H. For driving the data carrier 2, the reproduction apparatus 1 includes drive means 6. The drive means 6 have a centering shaft 7, which is provided for being inserted into the centering hole 2H of the data carrier 2 and which is connected to a drive adjuster 7T, which drive adjuster 7T is arranged for transferring drive forces to the data carrier 2. For driving the centering shaft 7 and the drive adjuster 7T, the drive means 6 include a motor 8. A motor winding in the motor 8, which winding is not shown in FIG. 1, is connected to its first winding terminal 8A to a reference potential G. The motor winding is connected with its second winding terminal 8B to a motor driver stage 9 included in the drive means 6. The motor driver stage 9 has a driver stage output 10 and is arranged for delivering a motor supply signal MS on the driver stage output 10. The motor supply signal MS is applied to the second winding terminal 8B of the motor 8. The motor driver stage 9 further has a driver stage input 11 on which the motor driver stage 9 receives a drive signal AS. The motor driver stage 9 is arranged for processing, more particularly, for amplifying the drive signal AS and for delivering the motor supply signal MS in accordance with the amplified drive signal AS. The drive means 6 are thus arranged for receiving a drive signal AS and for driving the data carrier 2 in accordance with the received drive signal AS.

The reproduction apparatus 1 further includes a reading device 12 with the aid of which the data stored on the data carrier 2 can be read from the data carrier 2 and even both the useful data A, D and the contents data ID. For this purpose, the reading device 12 includes reading means 13 which are arranged for reading the stored useful data A, D and for delivering the read useful data A, D as analog data A, D and for reading the stored contents data ID and for delivering the read contents data ID as analog data AD. The reading means 13 include a light source (not shown in FIG. 1) for generating and delivering a laser beam LL in the direction to the data carrier 2 and furthermore in the light converter means (not shown in FIG. 1) for receiving reflected reflection light RL in accordance with data stored on the data carrier 2 and for converting the reflection light RL into the analog data AD.

The reading device 12 further includes focus actuator means 14, which are arranged for receiving a focus actuator signal FAS and for adjusting the reading means 13 perpendicularly to the plane of the data carrier 2 in accordance with the focus actuator signal FAS. This enables a precise focusing of the laser beam LL on the track of the data carrier 2 with the aid of the focus actuator means 14, which laser beam LL is generated by the reading means 13.

The reading device 12 further has radial actuator means 15, which are arranged for receiving a radial actuator signal RAS and for adjusting the reading means 13 along a radial direction of the data carrier 2 in accordance with the radial actuator signal RAS. The reading means 13 can precisely follow the track on the data carrier 2 with the aid of the radial actuator means 15.

The reproduction apparatus 1 further includes a motor-driven slide 16, which is arranged for adjusting the reading device 12 along a radial direction of the data carrier 2. The reproduction apparatus 1 further includes radial drive means 17, which are arranged for receiving a radial drive signal RS and for radially adjusting the slide 16 and thus the reading device 12.

The reproduction apparatus 1 further includes a radial control stage 18, which is arranged for receiving the analog data AD and producing the radial drive signal RS and the radial actuator signal RAS in accordance with the received analog data AD. The radial control stage 18 is arranged for evaluating the received analog data AD when the reading means 13 are following the track of the data carrier 2. Depending on the evaluation made, the radial control stage 18 is arranged for delivering the radial drive signal RS to the radial drive means 17 for a coarse radial positioning of the reading means 13 in relation to the track of the data carrier 2. With the aid of the radial actuator signal RAS, which can be delivered by the radial control stage 18 to the radial actuator means 15, a fine radial positioning of the reading means 13 in relation to the track of the data carrier can be effected.

The radial actuator means 15 and the slide 16, as well as the radial drive means 17 and the radial control stage 18, form radial positioning means 19. The radial positioning means 19 are arranged for radially positioning the reading means on the track of the data carrier 2. The reading means 13, together with the radial positioning means 19, form a first control circuit which is provided for controlling the radial position of the reading means 13 when the reading means 13 are following the track on the data carrier 2. The first control circuit is so sensitive that with the aid of this circuit the radial position of the reading means 13 when following the track on the data carrier 2 can be controlled also in areas on the data carrier that store no useful data A, D or contents data ID. The radial control stage 18 of the radial positioning means 19 is further arranged for receiving a detection signal DS. Furthermore, after the radial control stage 18 has received the detection signal DS, it is arranged for radially shifting the reading means 13 from the useful data area 3 via the second contents data area 5 to before the beginning of the first contents data area 4. In connection with the high sensitivity of the first (radial) control circuit, it is therefore possible to position the reading means 13 in an unwritten area of the data carrier 2 and to follow the track of the data carrier 2 from there, although no signal (read data) for controlling the revolution velocity of the data carrier 2 and for establishing the actual position can be read.

The reproduction apparatus 1 includes a focus control stage 20, which is arranged for receiving the analog data AD and processing the analog data AD, to generate the focus actuator signal FAS, and for delivering the focus actuator signal FAS in response to the received analog data AD. Accordingly, the reading means 13 and the focus actuator means 14 and the focus control stage 20 form a second control circuit for focusing the laser beam LL on the track of the data carrier 2 which laser beam LL is generated by the reading means 13.

The reproduction apparatus 1 further includes signal processing means 21, which are arranged for processing the analog data AD produced by the reading means 13. For this purpose the signal processing means 21 include an audio data converter stage 22 and a data processing stage 23 as well as drive control means 24.

The audio data converter stage 22 is arranged for receiving the analog data AD and for converting the analog data AD into audio signals A and for delivering the audio signals A on an audio output A0 of the reproduction apparatus 1. In this connection it may be stated that the reproduction apparatus 1 may also include an audio amplifier to which a loudspeaker can be connected, so that the audio signals A can be directly delivered to the audio amplifier and, as a result, the pieces of music stored on the data carrier 2 can be directly acoustically reproduced by the reproduction apparatus 1 via the loudspeakers.

The data processing stage 23 is also arranged for receiving the analog data AD. The data processing stage 23 is furthermore arranged for converting the additional data D contained in the analog data AD into additional data D that can be processed digitally and the contents data ID contained in the analog data AD into contents data ID that can be processed digitally. The data processing stage 23 is furthermore arranged for delivering these additional data D and these contents data ID.

The drive control means 24 are arranged for receiving and evaluating the read analog data AD and, when using the read analog data AD, for generating and producing a controlled drive signal S1, to enable the data carrier 2 to be driven in response to the controlled drive signal S1. For the purpose of producing the controlled drive signal S1, the drive control means 24 have an output 25, which is connected via a line L to the input of the drive means 6, thus to the driver stage input 11 of the motor driver stage 9. The drive control means 24 further include a driver control stage 26 on the input side, which is arranged for evaluating the read analog data AD, and also for evaluating the data rate of the read analog data AD. A transistor control signal TS can be generated by the drive control stage 26 as a result of the evaluation of the data rate and this control signal TS can be delivered to an output driver stage 27 of the drive control means 24.

The output driver stage 27 includes a first transistor 28 and a second transistor 29, which in this case are arranged as field effect transistors. However, it may be observed that also bipolar transistors can be used instead of the field effect transistors. The first transistor 28 has a first electrode 30 and a second electrode 31, the first electrode 30 being connected to a supply voltage V. The second transistor 29 also has a first electrode 32 and a second electrode 33, while the second electrode 33 is connected to the reference potential G. The second electrode 31 of the first transistor 28 and the first electrode 32 of the second transistor 29 are connected at a switching point P. The first transistor 28 has a control electrode 34 and the second transistor 29 also has a control electrode 35. The two control electrodes 34 and 35 can be supplied with the transistor control signal TS, so that, in accordance with the evaluated data rate of the analog data AD, the controlled drive signal S1 can be tapped from the switching point P as a pulse width-modulated square-wave signal.

The drive control means 24 further include a third transistor 36, which third transistor 36 has a first electrode 37 and a second electrode 38 and a control electrode 39. The third transistor 36 is connected with its first electrode 37 to the switching point P. The third transistor 36 is further connected with its second electrode 38 to the output 25.

The first transistor 28 and the second transistor 29 and the third transistor 36 together form control means 40. The control means 40 are arranged for receiving a detection signal DS, which can be applied to the control electrode 39 of the third transistor 36, while, when the detection signal DS is received, the third transistor 36 can be blocked, so that it is possible to prevent the controlled drive signal S1 that can be tapped from the switching point P from being applied to the output 25 of the drive control means 24.

Accordingly, the third transistor 36 forms a switching means 41, so that the output 25 can be switched off with the aid of the switching means 41, which forms a part of the control means 40.

The reproduction apparatus 1 further includes drive control means 42, which are arranged for generating and delivering a controlled drive signal S2. The drive control means 42 are realized by a first resistor 43 and a second resistor 44, the first resistor 43 together with the second resistor 44 forming a voltage divider between the supply voltage V and the reference potential G, so that the controlled drive signal S2 can be tapped in the form of a DC voltage from a tapping point P of the voltage divider. The tapping point B of the voltage divider of the drive control means 42 is connected to the line L.

The reproduction apparatus 1 further includes detection means 45. The detection means 45 are arranged for receiving the additional data D which can be delivered by the data processing stage 23. With the aid of the detection means 45 there may be detected whether read analog data AD are available which are suitable for generating the controlled drive signal S1. When suitable analog data AD are lacking, thus when additional data D or contents data ID are received, which cannot be evaluated by the detection means 45, or when additional data D or contents data ID are completely lacking, the detection signal DS can be generated and delivered by the detection means 45. When suitable analog data AD are available, the detection means 45 are arranged for transferring the additional data D or the contents data ID to a digital data processing means 46, which is arranged for processing the additional data D or the contents data ID and communicating interface data ED with a user interface 47. The user interface 47 may show to a user of the reproduction apparatus 1, for example, the names of the pieces of music and their playing time contained in the additional data D or in the contents data ID.

The detection means 45 and the digital data processing means 46 form parts of data processing means 48 which are formed, in this case, by a microprocessor and program steps that can be executed by the microprocessor, which program steps are stored in a memory of the microprocessor or in an external memory.

The reading means 13 and the drive control means 24 together with the drive means 6 form a third control circuit for controlling the speed of rotation of the data carrier 2, when read analog data AD suitable for generating the controlled drive signal S1 are present, and for ensuring a constant data rate of the analog data AD when the data of the data carrier 2 are read. The detection means 45 and the control means 40 advantageously provide that this third control circuit can be switched off in the event of lacking suitable analog data AD and that after the third control circuit has been switched off, the data carrier 2 can be driven with a constant speed of rotation with the aid of the additionally provided drive control means 42, so that even then, when the reading means 13 scan an unwritten area of the data carrier 2, the data carrier 2 can be driven flawlessly. Accordingly, the control means 40, because it receives the detection signal DS, is arranged for enabling the data carrier 2 to be driven in accordance with the controlled drive signal S2.

FIG. 2 shows part of a further reproduction apparatus 1. In contrast to the reproduction apparatus 1 shown in FIG. 1, in the reproduction apparatus 1 shown in FIG. 2 the motor drive stage 9 is only arranged for receiving the controlled drive signal S1, which controlled drive signal S1 forms the drive signal AS when the data carrier 2 is driven in the controlled manner. Furthermore, the motor drive stage 9 is arranged for producing a first motor supply signal MS1 on a first output 50 and a second motor supply signal MS2 on a second output 51. The first motor supply signal MS1 is formed by a pulse width-modulated square-wave signal just like the controlled drive signal AS. The second motor supply signal MS2 is formed by a pulse width-modulated square-wave signal just like the controlled drive signal S1, whose amplitude is complementary to the first motor supply signal MS1.

The control means 40 in the reproduction apparatus 1 shown in FIG. 2 are positioned between the motor drive stage 9 and the motor 8. Similar to the reproduction apparatus 1 shown in FIG. 1, the control means 40 are also arranged for receiving the detection signal DS. The control means 40 include in the present case two switching means, that is a first switching 52 means and a second switching means 53. The two switching means 52 and 53 are formed by transistors. The first switching means 52 is connected to the first winding terminal 8A of the motor 8 via a first line 54. The second switching means 53 is connected to the second winding terminal 8B of the motor 8 via a second line 55. The first motor supply signal MS1 can be applied to the first switching means 52. The second motor supply signal MS2 can be supplied to the second switching means 53. The first switching means 52 is arranged for transferring the first motor supply signal MS1 to the first winding terminal 8A of the motor 8 when the detection signal DS is lacking. The second switching means 53 is arranged for transferring the second motor supply signal MS2 to the second winding terminal 8B of the motor 8 when the detection signal DS is lacking. When the detection signal DS is received, the data carrier 2 is driven in accordance with the controlled drive signal S2, which will be further discussed hereinafter.

The drive control means 42 come, in contrast to the drive control means 42 shown in FIG. 1, after the motor driver stage 9 and, similar to the drive control means 42 shown in FIG. 1, connected between the control means 40 and the motor 8. Similar to the drive control means 42 shown in FIG. 1, the drive control means 42 shown in FIG. 2 include the first resistor 43 and the second resistor 44. The first resistor 43 is connected with its first terminal 56 to the supply voltage V and with its second terminal 57 to the first line 54. The second resistor 44 is connected with its first terminal 58 to the reference potential G and with its second terminal 59 to the second line 55. When a first switch 52 is open and when a second switch 53 is open, the drive control means 42, provided for generating and delivering the controlled drive signal S2, deliver the generated controlled drive signal S2 to the motor 8 in the form of a DC voltage.

It may be observed that the drive control means 24 may also produce the controlled drive signal S1 in the form of an analog signal whose amplitude may be changed, for which analog signal a number of amplitude values may correspond to a speed of rotation of the data carrier 2.

It may be stated that a signal representing the set speed of rotation of the data carrier 2 may be delivered to the data processing means 48 by the drive control means 26. The data processing means 48 may in this connection also be arranged for evaluating the set speed of rotation of the data carrier 2. Furthermore, in this connection the data processing means 48 may also deliver the pulse width-modulated controlled drive signal S1. The control means 40 may then also be included in the data processing unit 48. In that case, the drive control means are formed by the drive control stage 26 and the control means 40 and the data processing means 48.

In the following will be explained with the aid of a first example of embodiment the way of operation of the reproduction apparatus 1 shown in FIG. 1 and shown in FIG. 2.

With this example of embodiment it is assumed that the reproduction apparatus 1 is arranged for reproducing data stored on a non-finalized data carrier 2. As observed in the beginning of the document, on a data carrier 2 that is not yet finalized, but has already been played, there are only data in the useful data area 3 and in the first contents data area 4, whereas the second contents data area 5 contains no data.

After the data carrier 2 is inserted into the reproduction apparatus 1, the reproduction apparatus 1 starts reproducing the data stored on the data carrier 2. The radial positioning means 19 for this purpose position the reading means 13 first inside the useful data area 3. Since in the assumed case there are data on the data carrier 2, the data read by the reading means 13 are delivered as analog data AD by the reading means 13. The read analog data AD are applied to the data processing stage 23 and delivered in the form of the digital additional data D by the data processing stage 23 to the detection means 45 included in the data processing means 48. The detection means 45 then detect that suitable analog data AD are present for generating the controlled drive signal S1. The digital additional data D are delivered for further processing to the digital data processing means 46 by the detection means 45. This terminates the testing whether the inserted data carrier 2 is a played data carrier and, with the aid of the drive control means 24, the controlled drive signal S1 is generated and applied to the drive means 6 as a drive signal AS.

Subsequently, in the reproduction apparatus 1 an attempt is made at reading the contents data ID of the final table of contents from the second contents data area 5, in which the contents data ID are stored when it is a finalized data carrier 2. For this purpose, with the aid of the radial positioning means 19, the reading means 13 are positioned relative to the second contents data area 5. However, since no contents data ID are stored on the non-finalized data carrier 2 in the second contents data area 5, no analog data AD suitable for generating and delivering a controlled drive signal S1 are read when this second contents data area 5 is scanned. This is detected by the detection means 45, after which the detection means 45 generate the detection signal DS and supply it to the control means 40 after which the control means 40 makes it possible to drive the data carrier 2 in accordance with the controlled drive signal S2, which controlled drive signal S2 is delivered to the drive means 6 as a drive signal AS in this mode of operation. This advantageously achieves that even when areas of the data carrier 2 in which no data are stored are scanned, the data carrier 2 is always driven with a suitable constant speed of rotation.

The detection signal DS is advantageously also received by the radial positioning means 19 and causes the reading means 13 to be displaced by the radial positioning means 19, and even before the beginning of the first contents data area 4. Also in this area, before the beginning of the first contents data area 4 of the data carrier 2, there are no data suitable for generating the controlled drive signal S1. With the aid of the first control circuit, the reading means 13 are nevertheless put on the track of the data carrier 2 until the reading means 13 finally reach the first contents data area 4. Once the reading means 13 have reached the first contents data area 4, they read analog data AD, that is, the contents data ID. In connection with the reading of the contents data ID from the first contents data area 4, there may be observed that this reading of the contents data ID takes place in accordance with the controlled drive signal S2 when the data carrier 2 is driven by the drive means 6. The temporary table of contents of the data carrier 2 read in the form of contents data ID from the first contents data area 4, is stored hereafter with the aid of the digital data processing means 46 and is consequently arranged for the exact positioning of the reading means 13 in the useful data area 3 for the purpose of reproducing pieces of music stored in the useful data area 3.

Once the reading means 13 have reached the first contents data area 4 and then contents data ID, thus analog data AD, control data and analog data are read out, which are suitable for generating a controlled drive signal S1, with the aid of the detection means 45 and the control means 40 it could be effected that the control means 40 deliver the controlled drive signal S1 as a drive signal AS to the drive means 6, so that then the contents data ID are read from the first contents data area 4 when the data carrier 2 is driven in accordance with the controlled drive signal S1 with the aid of the drive means 6.

As appears from the above-described example of embodiment for the two reproduction apparatus 1, with the reproduction apparatus 1 it is advantageously achieved that even with a non-finalized data carrier 2, the temporary table of contents of the data carrier 2 can be read out.

What is claimed is:

1. A reproduction apparatus (1)

which is arranged for reproducing data (A, D, ID) stored along at least one track on a rotary drivable optically readable data carrier (2) and which includes drive means (6), which are arranged for receiving a drive signal (AS) and for driving the data carrier (2) in accordance with the received drive signal (AS), and which includes reading means (13) which are arranged for reading the stored data (A, D, ID) and for delivering the read data (AD) and which includes drive control means (24) which are arranged for receiving and evaluating the read data (AD) and for generating and delivering a controlled drive signal (S1) while the read data (AD) are used, to enable the data carrier (2) to be driven in accordance with the controlled drive signal (S1), and which includes detection means (45) with whose help there may be detected whether read data suitable for generating the controlled drive signal (S1) are available and which are arranged for delivering a detection signal (DS) when such suitable data (AD) are lacking, characterized in that additional drive control means (42) are provided which are arranged for generating and delivering a controlled drive signal (S2) and in that control means (40) are provided which are arranged for receiving the detection signal (DS) and which, as a result of receiving the detection signal (DS), enable to drive the data carrier (2) in accordance with the controlled drive signal (S2).

2. A reproduction apparatus (1) as claimed in claim 1, characterized in that the drive control means (24) have at least one output (25) which can be switched off with the aid of switching means (41) form part of the control means (40), and which is connected via a line (L) to the input (11) of the drive means (6) and in that the drive control means (42) are connected via the line (L).

3. A reproduction apparatus (1) as claimed in claim 2, characterized in that the switching means (41) is formed by component parts of an output driver stage (40) of the drive control means (24).

4. A reproduction apparatus (1) as claimed in claim 2, characterized in that the drive control means (42) are formed by a resistor (43, 44).

5. A reproduction apparatus (1) as claimed in claim 1, characterized in that the reproduction apparatus (1) is arranged for reproducing the data (A, D, ID) from the data carrier (2), which data carrier (2) has a useful data area (3) and a first contents data area (4) separate from the useful data area (3), the former being provided for temporarily storing contents data (ID) of a table of contents, and has a second contents data area (5) separate from the useful data area (3) and the first contents data area (4), the second contents data area (5) is provided for permanently storing contents data (ID) of a table of contents, and in that radial positioning means (19) are provided for controlled radial positioning of the reading means (13) on the at least one track of the data carrier (2) and in that the radial positioning means (19) are arranged for receiving the detection signal (DS) and in that the radial positioning means (19) radially displace the reading means (13) before the beginning of the first table of contents (3) in response to the reception of the detection signal (DS).

* * * * *